United States Patent [19]
Gruenwald

[11] Patent Number: 5,912,038
[45] Date of Patent: Jun. 15, 1999

[54] AIR CLASSIFICATION OF WATER-BEARING FRUIT AND VEGETABLE INGREDIENTS FOR PEEL AND SEED REMOVAL AND SIZE DISCRIMINATION

[75] Inventor: Timothy I. Gruenwald, Fair Oaks, Calif.

[73] Assignee: Campbell Soup Company, Camden, N.J.

[21] Appl. No.: 08/888,011

[22] Filed: Jul. 3, 1997

[51] Int. Cl.[6] .................................. A23L 1/10; A23L 1/36
[52] U.S. Cl. .................... 426/481; 426/482; 426/484; 209/133
[58] Field of Search ...................... 426/481, 482, 426/484, 590; 209/133; 241/19, 24.16

[56] References Cited

U.S. PATENT DOCUMENTS

| | | | |
|---|---|---|---|
| 1,097,213 | 4/1914 | Crine | 426/484 |
| 1,874,181 | 8/1932 | Gavin | 426/481 |
| 3,962,072 | 6/1976 | Ramacher et al. | |
| 4,043,513 | 8/1977 | Hoberg et al. | 241/24 |
| 4,294,861 | 10/1981 | Ifuku et al. | 426/481 |
| 4,431,530 | 2/1984 | Syben . | |
| 4,602,559 | 7/1986 | Suzuki et al. | |
| 5,229,160 | 7/1993 | Lang | 426/481 |
| 5,279,427 | 1/1994 | Mobley | 209/668 |
| 5,545,422 | 8/1996 | Davies et al. | |

OTHER PUBLICATIONS

"Hi–Flo Air Cleaner", Key Technology, Inc., pp. 160–161.

*Primary Examiner*—Anthony J. Weier
*Attorney, Agent, or Firm*—Banner & Witcoff, Ltd.

[57] ABSTRACT

A method of separating diced water-bearing fruit of desired size from undersize slivers, loose seeds and pieces of skin in a diced fruit mix. The diced fruit mix is fed into an upwardly moving gaseous stream which removes loose and loosely adhering residual peel from the dice and carries the residual peel, loose seeds and undersize slivers above the select dice. The select dice is recovered from the gaseous stream separately from the residual peel, seeds and slivers. The method is particularly well suited for producing select tomato dice of desired size from tomato dice containing residual tomato peel and loose tomato seeds. The tomato dice is obtained by dicing whole tomatoes which have been peeled in a mechanical peeler. The method also can be used to separate diced water-bearing vegetable pieces of desired size from a vegetable mix containing undersize slivers of the vegetable.

17 Claims, 1 Drawing Sheet

AIR CLASSIFICATION OF WATER-BEARING FRUIT AND VEGETABLE INGREDIENTS FOR PEEL AND SEED REMOVAL AND SIZE DISCRIMINATION

BACKGROUND OF THE INVENTION

This application relates to the processing of fruits and vegetables and, more particularly, to the processing of diced fruits and vegetables to separate the pieces by size, and to remove seeds or pieces of peel.

Tomato ingredient in the form of tomato dice is prepared from whole peeled tomatoes. The mechanical peeling process is not perfect, however, and some residual tomato peel usually remains on the whole tomatoes. Conventional practice uses manual labor to remove residual peel. Typically, a 30 ton per hour operation requires 13 to 17 people to remove residual peel to a level that will comply with Title 21 of the Code of Federal Regulations. Once the tomatoes are diced, undesirable tomato slivers, which are smaller than pieces of desired size, must be mechanically separated from the dice with a sliver remover, e.g., of the rotary type described in U.S. Pat. No. 5,279,427, which is incorporated herein by reference. While automation of the entire peeling process would significantly reduce labor costs, the cost of acquiring and maintaining additional machinery would tend to offset some of the labor savings.

SUMMARY OF THE INVENTION

It is, therefore, an object of the present invention to provide a method for producing quality tomato dice which minimizes both the labor and machinery costs associated with the process. This and other objects are accomplished by the use of an air classification process on diced tomatoes prepared from mechanically peeled tomatoes, i.e., with little or no manual removal of residual peel. Air classification, which involves passing the diced tomatoes across an upwardly moving stream of air, surprisingly achieves the dual objectives of effectively removing and separating loose and loosely adhering residual peel from the dice, and separating out tomato slivers. The process also serves to remove loose or loosely adhering seeds from the dice. Further, the process is useful for producing quality dice of other water-bearing fruits, and water-bearing vegetables.

According to one aspect of the present invention, there is provided a method for producing select tomato dice from whole tomatoes. Whole tomatoes are mechanically peeled and diced. The diced tomatoes are then fed into an upwardly moving gaseous stream which removes loose and loosely adhering residual peel from the dice and carries the residual peel, loose seeds and undersize tomato slivers above the select tomato dice. The select tomato dice is recovered from the gaseous stream separately from the residual peel, seeds and slivers. Tomato juice is removed from the diced tomatoes before they are fed into the upwardly moving gaseous stream.

According to another aspect of the invention, there is provided a method of separating diced water-bearing fruit of desired size from undersize slivers, loose seeds and pieces of skin in a diced fruit mix. The diced fruit mix is fed into an upwardly moving gaseous stream which removes loose and loosely adhering residual peel from the dice and carries the residual peel, loose seeds and undersize slivers above the select dice. The select dice is recovered from the gaseous stream separately from the residual peel, seeds and slivers.

According to yet another aspect of the invention, there is provided a method of separating diced water-bearing vegetable of desired size from undersize slivers in a diced vegetable mix. The diced vegetable mix is fed into an upwardly moving gaseous stream which carries undersize slivers above the select dice. The select dice is recovered from the gaseous stream separately from the slivers.

DETAILED DESCRIPTION

The method of the invention will be described with reference to the processing of tomatoes. It is to be understood, however, that other water-bearing fruits, and water-bearing vegetables, can be processed using the air classification method described.

Figure 1:
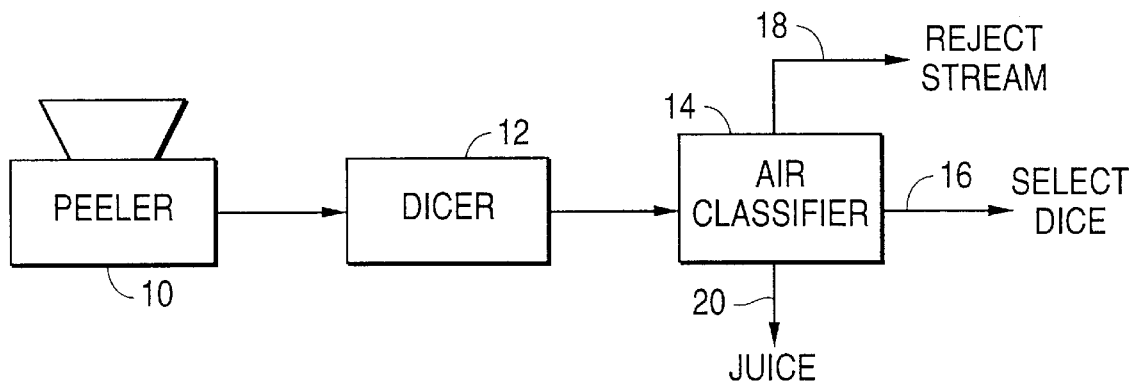
FIG. 1 is a schematic flow diagram of the method according to the invention.

Referring to FIG. 1, whole tomatoes are peeled in a conventional mechanical peeler 10 and then are fed to a conventional dicer 12. Dicer 12 is set to produce select tomato dice in cube form of a desired size. Select cubed tomato dice typically ranges from ⅜ inch to 1 inch in size, as measured along an edge of the cube. The output of dicer 12 comprises a diced mix of select tomato dice, tomato slivers and residual peel. Slivers are those tomato pieces which are less than half the size of the preset select size. For example, if dicer 12 is set to produce select dice in ¾ inch cube form, any dice less than ⅜ inch in size would be considered slivers, and rejected. The tomato dice is fed to an air classifier 14, which separates select dice 16 from rejected slivers, residual peel and loose seeds 18, and also collects tomato juice runoff 20.

Figure 2:
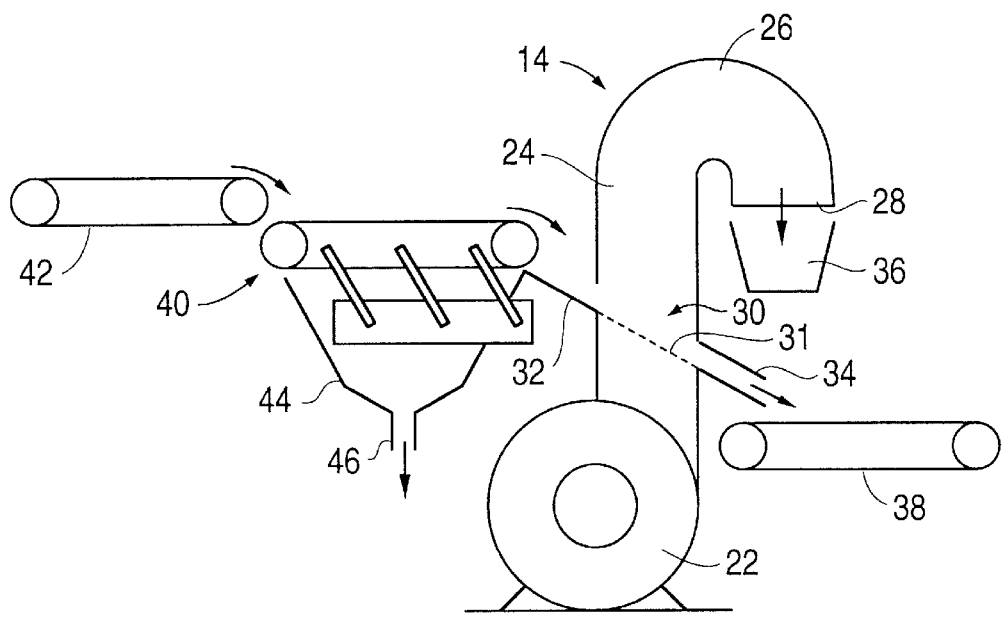
FIG. 2 is a schematic illustration of an air classification apparatus used to practice the method according to the invention.

Referring to FIG. 2, air classifier 14 overall is a conventional device of the type used for classifying dry foodstuffs such as nuts, corn kernels, beans, seeds and grain. Examples of this type of apparatus are the Model Nos. 8 and 16 HI-FLO™ "air cleaners" manufactured by Key Technology, Inc. The air classifier comprises an electrically-driven blower 22 which delivers a high volumetric flow of air to the bottom of vertical conduit 24. The upper end of conduit 24 is equipped with a 180° elbow 26 with an open, downwardly facing outlet 28. Extending across the upward air flow through conduit 24 is a perforated, screen-like stainless steel plate 30 disposed at approximately 30° to the horizontal. An inlet chute 32 delivers material to plate 30, while an outlet chute 34 carries material away from the plate. Air flowing upwardly through conduit 24 passes through the apertures 31 in plate 30 and entrains the lighter materials, carrying them upwardly and through elbow 26 until they are deposited in a collection tank 36. The heavier materials continue their gravity flow across plate 30 and emerge through outlet chute 34 to be removed by a conveyor 38. Material is fed to air classifier 14 by a conventional feed shaker 40 of known construction. Material can be fed to feed shaker 40 by means of a conveyor 42.

In practicing the method according to the invention, the tomato dice which emerges from dicer 12 is delivered by conveyor 42 to feed shaker 40. Feed shaker 40 has a screened bottom (not shown) with a mesh size which retains most solids but allows tomato juice to pass through the screen and thereby be separated from the dice. The juice runoff is collected in a hopper 44 and removed through outlet 46. The partially dewatered tomato dice then slides down chute 32 onto plate 30 in conduit 24. Air moving upwardly through the apertures 31 in plate 30 at the appropriate velocity entrains tomato slivers, loose and loosely adhering residual peel and loose seeds, but allows select tomato dice to remain on plate 30 and pass out of conduit 24 through outlet 34. The slivers, residual peel and loose seeds continue upwardly and around elbow 26 until they are deposited in collection tank 36. Any peel still adhering to the select dice can be removed, if desired, with a minimal amount of manual labor.

The appropriate velocity of air moving upwardly through conduit 24 is a function of the desired select dice size. The smaller the select dice size, the lower the velocity required to entrain slivers, residual peel and loose seeds, yet allow the select dice to remain on plate 30. Thus, for select dice at the lower end of size the range (⅜ inch), air velocity on the order of about 30 ft/sec would be appropriate. At the upper end of the select dice size range (1 inch), air velocity on the order of about 75 ft/sec would be appropriate.

EXAMPLE

Whole, mechanically peeled tomatoes were fed to a conventional dicer set to deliver select tomato dice ¾ inch in size. The tomato dice was fed via a feed shaker at the rate of 17,522 lb/hr to a Model No. 8 Key Technology, Inc. HI-FLO™ "air cleaner" delivering a 16,000 cfm air stream flowing upwardly at a velocity of 58 ft/sec. The apparatus produced 12,266 lb/hr of select dice, 1,752 lb/hr of reject material (slivers and peel), and 3,504 lb/hr of tomato juice. The total capacity of the air classifier used is 25,000 lb/hr of tomato dice. Neither manual peel removal nor mechanical sliver removal was required prior to air classification to achieve this high level of performance.

The above description and example of the method of the invention are intended to be illustrative only, and not limitations on the scope of the invention, which is defined by the appended claims.

I claim:

1. A method for producing select tomato dice of desired size from whole tomatoes comprising the steps of:
   mechanically removing the peels from whole tomatoes;
   dicing the whole peeled tomatoes to produce select tomato dice mixed with loose and loosely adhering residual peel, loose seeds and undersize tomato slivers;
   feeding the diced tomatoes into an upwardly moving gaseous stream which removes loose and loosely adhering residual peel from the dice and carries the residual peel, loose seeds and undersize tomato slivers above the select tomato dice; and
   recovering the select tomato dice from the gaseous stream separately from the residual peel, seeds and slivers.

2. The method according to claim 1, further comprising the step of separately removing tomato juice from the diced tomatoes.

3. The method according to claim 2, wherein the step of removing tomato juice comprises separating tomato juice from the diced tomatoes before they are fed into the upwardly moving gaseous stream.

4. The method according to claim 1, wherein the select tomato dice is generally cube-shaped, the desired select tomato dice size is selected from the range of about ⅜ inch to about 1 inch as measured along an edge of the cube, and the upward velocity of the gaseous stream is selected in relation to the desired select tomato dice size from the range of about 30 ft/sec to about 75 ft/sec.

5. The method according to claim 4, wherein the select tomato dice is about ¾ inch in desired size, and the velocity of the gaseous stream is about 58 ft/sec.

6. A method for producing select tomato dice of desired size from whole, peeled tomatoes, comprising the steps of:
   dicing the whole peeled tomatoes to produce select tomato dice mixed with loose and loosely adhering residual peel, loose seeds and undersize tomato slivers;
   feeding the diced tomatoes into an upwardly moving gaseous stream which removes loose and loosely adhering residual peel from the dice and carries the residual peel, loose seeds and undersize tomato slivers above the select tomato dice; and
   recovering the select tomato dice from the gaseous stream separately from the residual peel, seeds and slivers.

7. The method according to claim 6, further comprising the step of separately removing tomato juice from the diced tomatoes.

8. The method according to claim 7, wherein the step of removing tomato juice comprises separating tomato juice from the diced tomatoes before they are fed into the upwardly moving gaseous stream.

9. The method according to claim 6, wherein the select tomato dice is generally cube-shaped, the desired select tomato dice size is selected from the range of about ⅜ inch to about 1 inch as measured along an edge of the cube, and the upward velocity of the gaseous stream is selected in relation to the desired select tomato dice size from the range of about 30 ft/sec to about 75 ft/sec.

10. The method according to claim 9, wherein the select tomato dice is about ¾ inch in desired size, and the velocity of the gaseous stream is about 58 ft/sec.

11. A method of separating select diced water-bearing fruit of desired size from undersize slivers, loose seeds and pieces of skin of said fruit in a diced fruit mix, comprising the steps of:
    feeding the diced fruit mix into an upwardly moving gaseous stream which removes loose and loosely adhering residual peel from the dice and carries the residual peel, loose seeds and undersize slivers above the select dice; and
    recovering the select dice from the gaseous stream separately from the residual peel, seeds and slivers.

12. The method according to claim 11, further comprising the step of separately removing fruit juice from the diced fruit.

13. The method according to claim 12, wherein the step of removing fruit juice comprises separating fruit juice from the diced fruit before it is fed into the upwardly moving gaseous stream.

14. The method according to claim 11, wherein said fruit is tomatoes.

15. The method according to claim 11, wherein the select dice is generally cube-shaped, the desired select dice size is selected from the range of about ⅜ inch to about 1 inch as measured along an edge of the cube, and the upward velocity of the gaseous stream is selected in relation to the desired select dice size from the range of about 30 ft/sec to about 75 ft/sec.

16. The method according to claim 15, wherein the select dice is about ¾ inch in desired size, and the velocity of the gaseous stream is about 58 ft/sec.

17. A method of separating select diced water-bearing vegetable of desired size from undersize slivers of said vegetable in a diced vegetable mix, comprising the steps of:
    feeding the diced vegetable mix into an upwardly moving gaseous stream which carries undersize slivers above the select dice; and
    recovering the select dice from the gaseous stream separately from the slivers.

\* \* \* \* \*